(12) United States Patent
Terao (10) Patent No.: US 9,763,277 B2
(45) Date of Patent: Sep. 12, 2017

(54) COMMUNICATION DEVICE, METHOD FOR CONTROLLING THE COMMUNICATION DEVICE, AND STORAGE MEDIUM (71) Applicant: CANON KABUSHIKI KAISHA, Tokyo (JP)

(72) Inventor: Tsuyoshi Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 14/580,026

(22) Filed: Dec. 22, 2014

(65) Prior Publication Data
US 2015/0181635 A1 Jun. 25, 2015

(30) Foreign Application Priority Data

Dec. 25, 2013 (JP) ................................. 2013-267135
Oct. 9, 2014 (JP) ................................. 2014-208403

(51) Int. Cl.
*H04W 76/02* (2009.01)
*H04W 40/24* (2009.01)
*H04W 76/04* (2009.01)
*H04W 8/00* (2009.01)
*H04W 84/12* (2009.01)

(52) U.S. Cl.
CPC ......... *H04W 76/023* (2013.01); *H04W 8/005* (2013.01); *H04W 40/24* (2013.01); *H04W 76/043* (2013.01); *H04W 84/12* (2013.01)

(58) Field of Classification Search
CPC . H04W 76/023; H04W 76/043; H04W 8/005; H04W 40/24
See application file for complete search history.

(56) References Cited

U.S. PATENT DOCUMENTS

| 2013/0342710 A1* | 12/2013 | Kanma ................. H04W 48/16 348/207.1 |
| 2015/0341849 A1* | 11/2015 | Lee ....................... H04W 48/16 455/41.2 |
| 2015/0382287 A1* | 12/2015 | Kim .................... H04W 76/023 370/338 |
| 2016/0373914 A1* | 12/2016 | Lee ....................... H04W 8/005 |

FOREIGN PATENT DOCUMENTS

JP 2011-35768 A 2/2011

* cited by examiner

*Primary Examiner* — Ashley Shivers
(74) *Attorney, Agent, or Firm* — Canon U.S.A., Inc. IP Division (57) ABSTRACT A search signal is either transmitted or waited for, in accordance with a role in a service specified by an upper-level application.

20 Claims, 8 Drawing Sheets

COMMUNICATION DEVICE, METHOD FOR CONTROLLING THE COMMUNICATION DEVICE, AND STORAGE MEDIUM

BACKGROUND OF THE INVENTION

Field of the Invention

The present invention relates to a communication device, a method for controlling the communication device, and a program.

Description of the Related Art

In recent years, there have been a growing number of cases where electronic devices, such as digital cameras and printers, are equipped with a wireless local area network (LAN) station function and used as communication devices on a wireless LAN. For example, Japanese Patent Laid-Open No. 2011-35768 discloses an image sharing technique which involves using a digital camera equipped with a wireless LAN function.

The Wi-Fi Alliance established a standard called Wi-Fi Direct (registered trademark). The Wi-Fi Direct defines a protocol that determines whether each communication device operates as a wireless LAN access point or a wireless LAN station. Executing the protocol automatically determines which communication device serves as a wireless LAN access point and which communication device serves as a wireless LAN station.

The Wi-Fi Direct also defines a device discovery which is a protocol for searching for a partner device to be connected. The device discovery searches for a partner device by repeating search mode and wait mode in a random cycle. Each communication device transmits a search signal to search for a partner device in search mode (referred to as Search State in Wi-Fi Direct), and waits (or listens) for a search and responds to the search from the partner device in wait mode (referred to as Listen State in Wi-Fi Direct).

The Wi-Fi Direct also defines, as an optional function, a service discovery function which is the function of advertising and searching for information about services supported by an upper-level application. With the service discovery function, information about the function of a partner device can be obtained before execution of a connection process.

SUMMARY OF THE INVENTION

However, with the device discovery, a partner device cannot be detected unless one is in Search State and the other is in Listen State. Repeating Search State and Listen State in a random cycle may take some time to detect a partner device.

The present invention provides a technique in which a searching device and a device that waits for a search are determined in advance, in accordance with a predetermined condition, to reduce the time to detect a partner device.

A communication device according to an aspect of the present invention is a communication device that communicates with another communication device and includes a searching unit configured to search for a function provided by the other communication device; a notification unit configured to notify the other communication device of a function provided by the communication device; a determining unit configured to determine whether, when a wireless network is established between the communication device and the other communication device, a predetermined service implemented via the wireless network is specified in either the communication device or the other communication device; and a changing unit configured to change the length of time for a search performed by the searching unit and the length of time for a notification performed by the notification unit, in accordance with a determination made by the determining unit.

Further features of the present invention will become apparent from the following description of exemplary embodiments with reference to the attached drawings.

DESCRIPTION OF THE EMBODIMENTS

First Embodiment

A first embodiment will be described in detail with reference to the drawings. Although the following describes an example where a wireless LAN system compliant with the Institute of Electrical and Electronics Engineers (IEEE) 802.11 series is used, the communication scheme is not necessarily limited to a wireless LAN compliant with the IEEE 802.11 series. For example, the communication scheme may be compliant with another communication standard, such as the Bluetooth (registered trademark) or Long-Term Evolution (LTE).

Figure 1:
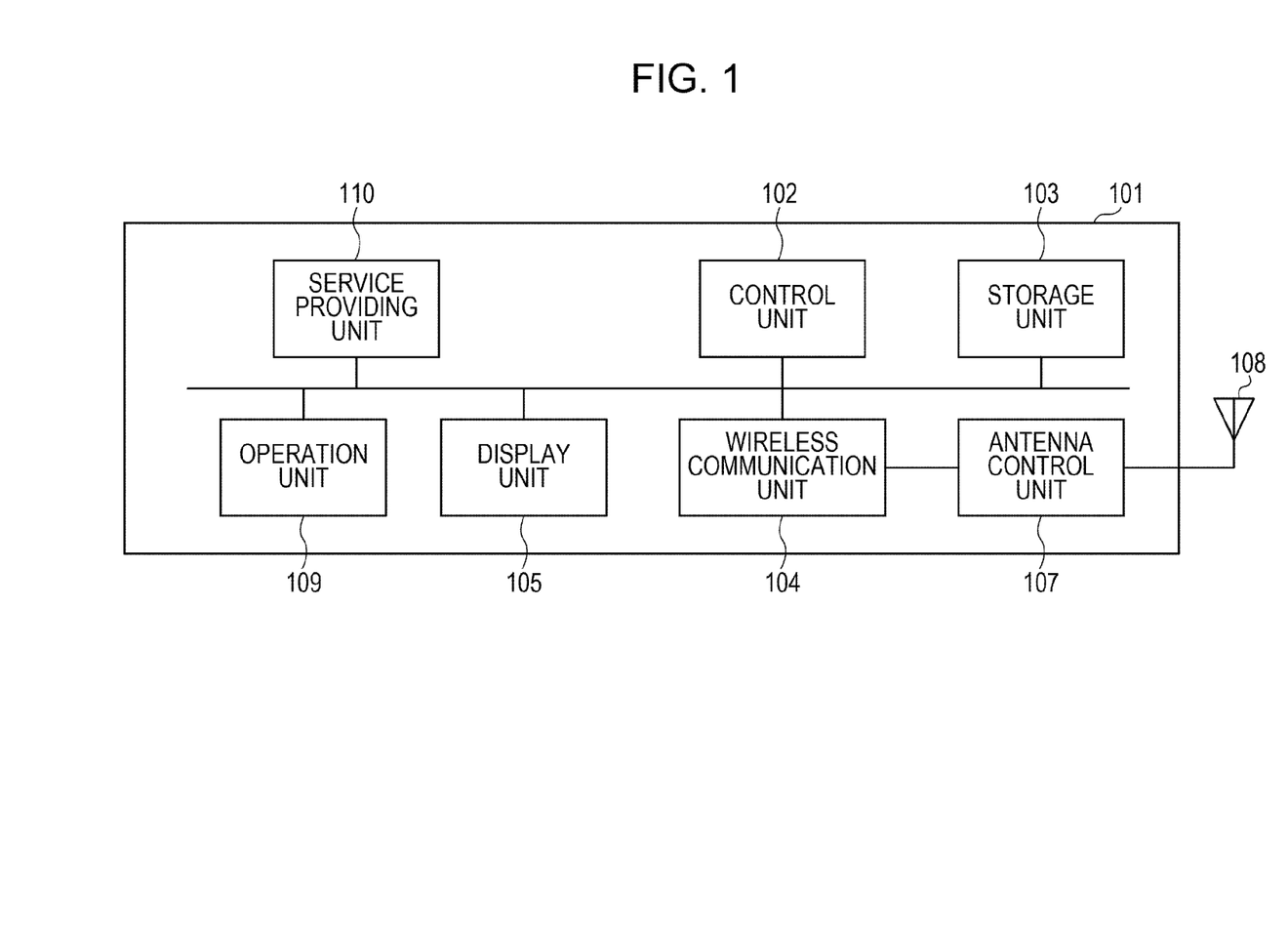
FIG. 1 is a block diagram illustrating a configuration of a communication device according to an embodiment of the present invention.

FIG. 1 is a block diagram illustrating a configuration of a communication device according to an embodiment of the present invention. In a communication device 101, a control unit 102 controls the overall operation of the communication device 101 by executing a control program stored in a storage unit 103. The control unit 102 also controls the setting of communication parameters between the communication device 101 and another device. The storage unit 103 stores the control program executed by the control unit 102 and various types of information, such as communication parameters. Various operations described below are carried out when the control unit 102 executes the control program stored in the storage unit 103.

A wireless communication unit 104 is for performing wireless LAN communication compliant with the IEEE 802.11 series. A display unit 105 performs various display operations. The display unit 105 is capable of outputting visually perceivable information, like a liquid crystal display (LCD) or a light emitting diode (LED) display, or is capable of outputting sound, like a speaker. The display unit 105 has the function of outputting at least one of visual information and audio information.

The communication device 101 includes an antenna control unit 107 and an antenna 108. An operation unit 109 allows the user to input various types of data to operate the communication device 101.

A service providing unit 110 has the function of providing service information at the application level of the communication device 101. For example, if the communication device 101 is a printer, the service providing unit 110 is a printing unit that provides a printing function, whereas if the communication device 101 is a digital camera, the service providing unit 110 is an image pickup unit that provides an image pickup function.

Figure 2:
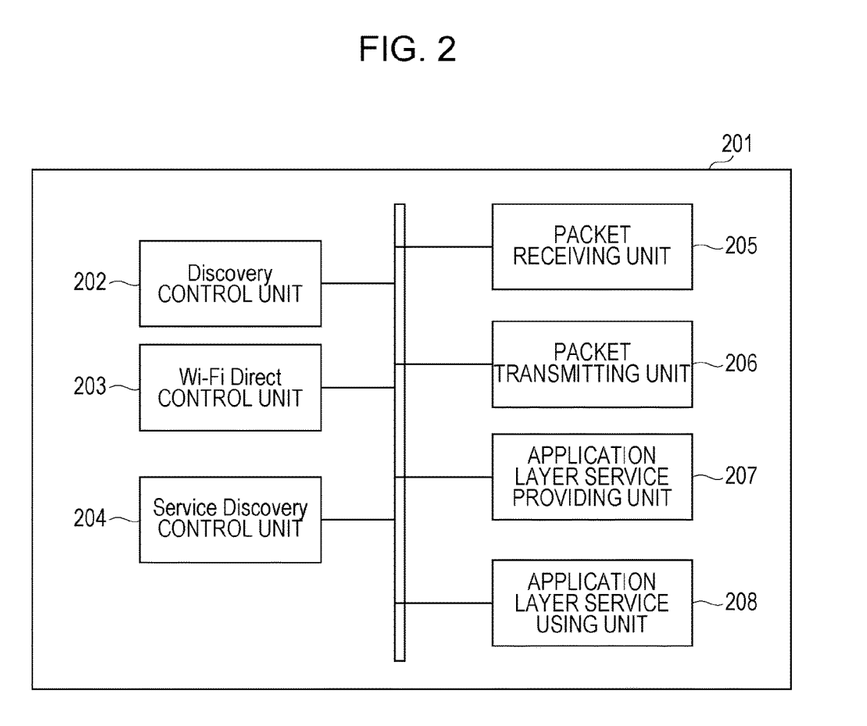
FIG. 2 is a block diagram illustrating a configuration of software function blocks in the communicating device.

FIG. 2 is a block diagram illustrating a configuration of software function blocks that execute a communication control function. The software function blocks are implemented when the control unit 102 executes the control program stored in the storage unit 103.

In an entire software function block 201, a Discovery control unit 202 performs a search process that searches for a communication device serving as a communication partner.

A Wi-Fi Direct control unit 203 performs control based on a Wi-Fi Direct protocol specification. In Wi-Fi Direct, a communication device that implements a wireless LAN access point function is referred to as a P2P group owner (hereinafter referred to as GO), and a communication device that implements a wireless LAN station function is referred to as a P2P client (hereinafter referred to as CL). These roles are determined by a GO Negotiation protocol defined in the Wi-Fi Direct specification.

In Wi-Fi Direct, a network formed by GOs is referred to as a P2P group. In the present specification, a network may also be referred to as a P2P group. That is, the terms "network" and "P2P group" are synonymously used in the present specification.

In the present specification, a P2P group owner (GO), a P2P client (CL), and a group of communication devices with an undetermined role are collectively referred to as P2P devices.

A Service Discovery control unit 204 performs a service discovery which involves transmitting and receiving action frames defined by the IEEE 802.11u to allow service information owned by the communication device 101 and a partner communication device (hereinafter simply referred to as a partner device) to be exchanged between them. Specifically, the communication device 101 transmits an SD Query requesting service information provided by the partner device, and receives an SD Response from the partner device as a response signal corresponding to the SD Query. Alternatively, the communication device 101 receives, from the partner device, an SD Query requesting service information provided by the communication device 101, and transmits an SD Response to the partner device as a response to the SD Query.

The SD Query and the SD Response each contain protocol information and service function support information. The protocol information is information about a protocol that can be used by a sender device (i.e., a device sending the SD Query or the SD Response) for communication between the communication device 101 and the partner device. The service function support information is information about essential and optional functions supported by a service provided by the sender device. For example, in the case of a printer, information as to whether double-sided printing, color or monochrome printing, or format printing is supported can be sent or received through the service function support information. The examples described here are not intended to limit the scope of the present invention, and are provided for illustrative purposes to facilitate an understanding of the invention.

A packet receiving unit 205 and a packet transmitting unit 206 perform all types of transmission and reception of packets including upper layer communication protocols. An application layer service providing unit 207 is a service providing unit in the application layer. Here, the application layer refers to a service providing layer in the upper layers (fifth and higher layers) of the Open Systems Interconnection (OSI) reference model. That is, the application layer service providing unit 207 provides, for example, a printing service, a video streaming service, an image transfer service, or a file transfer service.

An application layer service using unit 208 is a service using unit in the application layer. The application layer service using unit 208 receives a service from a service providing unit in the application layer of a partner device. For example, the application layer service using unit 208 has the function of transmitting printed matter to a printing service providing device, or the function of transmitting a video image to a digital display.

All the function blocks illustrated in FIG. 2 are interrelated to one another either by software or hardware. The function blocks described above are merely an example. A plurality of function blocks may form a single function block, or any of the function blocks may be divided into a plurality of function blocks. Some or all the function blocks may be configured as hardware blocks.

Figure 3:
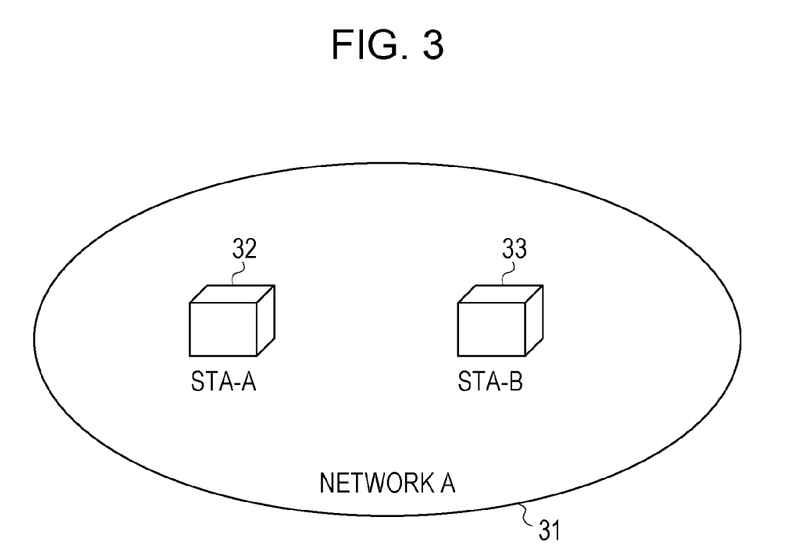
FIG. 3 illustrates a network configuration to which the present invention is applied.

FIG. 3 illustrates a wireless network A31 (hereinafter referred to as network A) formed by a communication device A32 (hereinafter referred to as STA-A) and a communication device B33 (hereinafter referred to as STA-B) each having the configuration described above. The first embodiment describes a service search process and a connection process in the wireless LAN layer performed when, for example, a printing service or a video streaming service is executed.

Figure 4:
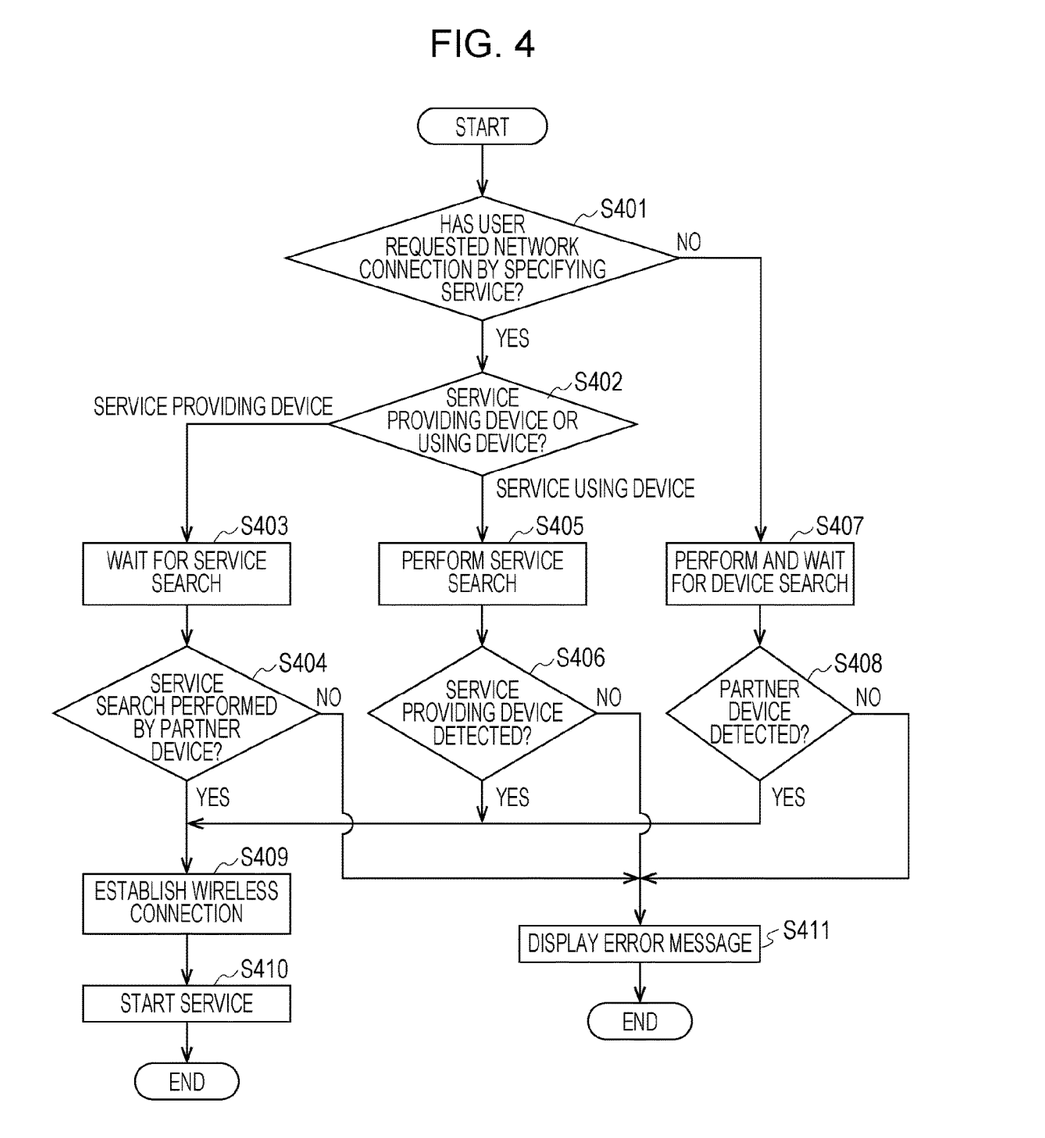
FIG. 4 is a flowchart of an operation performed by a communication device according to a first embodiment of the present invention.

FIG. 4 is a flowchart of an operation performed when the control unit 102 executes the control program stored in the storage unit 103. The operation of the communication device 101, from a service search to the start of service operation, will be described with reference to the flowchart.

Before the start of a Wi-Fi Direct operation, the Wi-Fi Direct control unit 203 determines whether the user has requested a network connection by specifying a service (step S401). If the user has requested a network connection by specifying a service (e.g., if printing via a wireless network has been requested by the user from the operation unit 109), the Wi-Fi Direct control unit 203 determines to perform a service search before the network connection. If the user has requested a network connection without specifying a service, the Wi-Fi Direct control unit 203 determines not to perform a service search before the network connection. If the user has requested a network connection by specifying a service, a service search is performed before the network connection, whereas if the user has requested a network connection without specifying a service, a service search is not performed before the network connection.

If it is determined in step S401 to perform a service search before network connection (YES in step S401), the Service Discovery control unit 204 determines whether the STA-A operates as a service providing device or a service using device in the specified service (step S402). For example, if a printing function is specified as the service, the Service Discovery control unit 204 determines that the STA-A operates as a service providing device that provides the service. If a print data transmitting function of transmitting print data to a printing device is specified as the service, the Service Discovery control unit 204 determines that the STA-A operates as a service using device that uses the service.

If it is determined in step S402 that the STA-A operates as a service providing device, the Service Discovery control unit 204 waits for a service search from a partner device (step S403). That is, the Service Discovery control unit 204 waits for an incoming packet in Listen State in accordance with the Wi-Fi Direct specification. Specifically, the Service Discovery control unit 204 performs a search signal receiving operation for a predetermine period of time on a wireless frequency channel determined at the start of the Wi-Fi Direct operation. If a Probe Request (search request) is received from a partner device, the communication device 101 returns a Probe Response (search response) to the partner device. If an SD Query is received from a partner device, the communication device 101 returns an SD Response to the partner device.

Next, the Service Discovery control unit 204 determines whether any partner device has performed a service search in wait mode in step S403 (step S404). For example, if a Probe Request or an SD Query has been received in Listen State, the Service Discovery control unit 204 determines that a partner device has performed a service search. If it is determined that a partner device has performed a service search (YES in step S404), the Wi-Fi Direct control unit 203 establishes a wireless connection with the partner device operating as a service using device (step S409). Specifically, the service providing device and the service using device form a P2P group in accordance with the Wi-Fi Direct specification to establish a connection in the wireless LAN layer and the Internet protocol (IP) layer. After the connection is established, the service is started (step S410). If it is determined that no partner device has performed a service search in wait mode in step S403 (NO in step S404), the Wi-Fi Direct control unit 203 displays a message on the display unit 105 to indicate that there is no partner device (step S411). Then, the process comes to an abnormal end. If it is determined in step S404 that no partner device has performed a service search within the predetermined period of time, the process may proceed to step S407, where the device discovery defined in Wi-Fi Direct is performed.

If it is determined in step S402 that the STA-A operates as a service using device, the Service Discovery control unit 204 performs a service search (step S405). That is, in accordance with the Wi-Fi Direct specification, the Service Discovery control unit 204 searches for a partner device and a service provided by the partner device in Search State for a predetermined period of time. Specifically, the Service Discovery control unit 204 broadcasts a Probe Request and receives a Probe Response from a partner device to detect the partner device. Also, the Service Discovery control unit 204 transmits an SD Query using the service discovery function and receives an SD Response to detect a service provided by the partner device. A service provided by the partner device may be detected by adding an Information Element (IE) containing the device's service information to the Probe Request and the Probe Response. Thus, without transmitting and receiving the SD Query and the SD Response, a partner device and a service provided by the partner device can be detected simply by transmitting and receiving the Probe Request and the Probe Response.

Next, the Service Discovery control unit 204 determines whether a partner device providing a predetermined service has been detected in step S405 (step S406). For example, if an SD Response has been received within a predetermined period of time, the Service Discovery control unit 204 determines that a partner device providing a predetermined service has been detected. Alternatively, the Service Discovery control unit 204 may determine that a partner device providing a predetermined service has been detected if a Probe Response provided with an IE has been received within a predetermined period of time.

If it is determined that a partner device providing a predetermined service has been detected (YES in step S406), the Wi-Fi Direct control unit 203 establishes a wireless connection with the partner device operating as a service providing device (step S409). If it is determined that no service response has been received (NO in step S406), the Wi-Fi Direct control unit 203 displays a message on the display unit 105 to indicate that there is no partner device (step S411). Then, the process comes to an abnormal end. If it is determined in step S406 that no service response has been received within a predetermined period of time, the process may proceed to step S407, where the device discovery defined in Wi-Fi Direct is performed.

If it is determined in step S401 not to perform a service search before network connection (NO in step S401), the Discovery control unit 202 performs a device discovery process defined in Wi-Fi Direct (step S407). The device discovery process involves alternately repeating Search State and Listen State in a random cycle. In Search State, the Discovery control unit 202 transmits a Probe Request and waits for receipt of a Probe Response. In Listen State, the Discovery control unit 202 waits for receipt of a Probe Request and returns a Probe Response.

Next, the Discovery control unit 202 determines whether a partner device has been detected in the device discovery process (step S408). If no partner device has been detected (NO in step S408), the Wi-Fi Direct control unit 203 displays a message on the display unit 105 to indicate that there is no partner device (step S411). Then, the process comes to an abnormal end.

On the other hand, if a partner device has been detected (YES in step S408), the Wi-Fi Direct control unit 203 establishes a wireless connection with the detected partner device (step S409). Specifically, the service providing device and the service using device form a P2P group in accordance with the Wi-Fi Direct specification to establish a connection in the wireless LAN layer and the IP layer. After the connection is established, the service is started (step S410). Before the service starts in step S410, a service discovery may be performed in the network layer (Layer 3) in the OSI reference model. For example, the service discovery function is performed in accordance with a protocol, such as Universal Plug and Play (UPnP) (registered trademark) or Bonjour (registered trademark).

In a printing service, a service using device in the present invention is a device that has data of images and documents to be printed, and a service providing device in the present invention is a device that has a printing function of receiving data from the service using device and printing the data. For example, the service using device is a digital camera or a smartphone, and the service providing device is a printer. In a video streaming service, the service using device is a video recording device, such as a digital camera or a camcorder, and the service providing device is an image display device, such as a digital TV or a projector.

If the service to be used is compliant with the Digital Living Network Alliance (DLNA) (registered trademark) standard, for example, the service using device is a digital media server (DMS) and the service providing device is a digital media renderer (DMR). The DLNA standard defines various device classes, and those described herein are merely examples. The DLNA standard should be referred to for the details.

Figure 5:
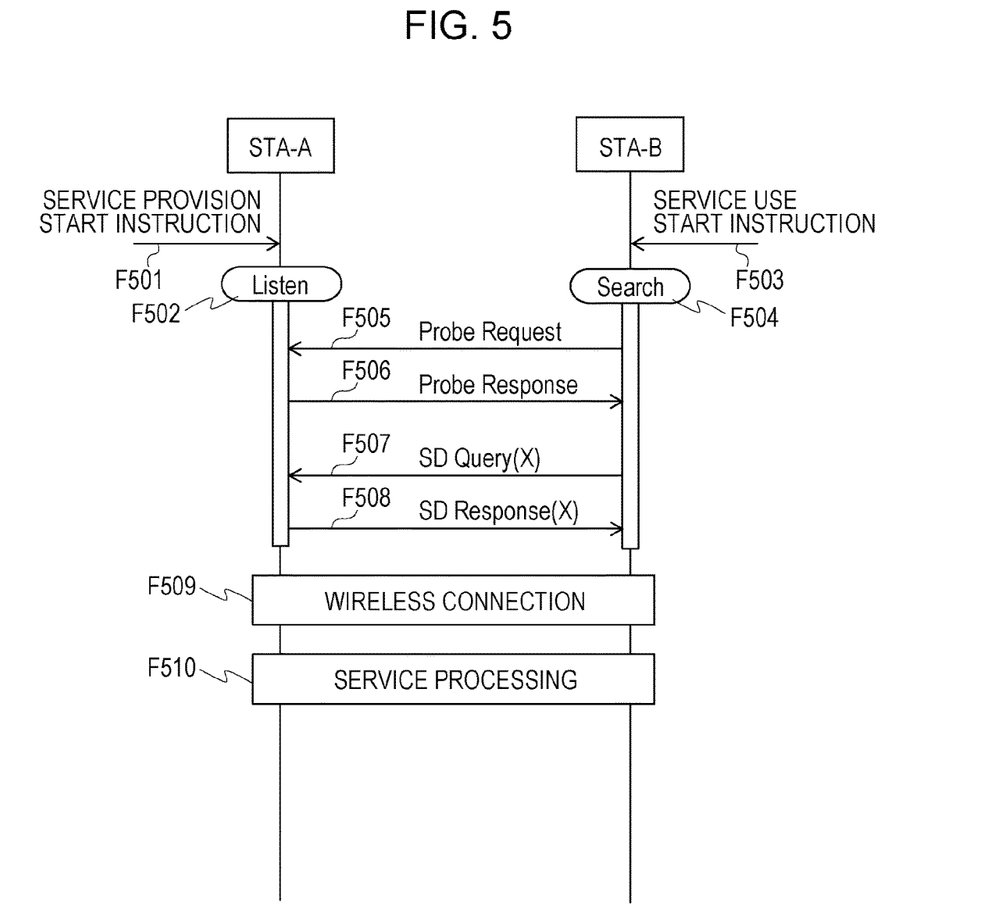
FIG. 5 is a sequence chart in the first embodiment.

FIG. 5 illustrates an operation sequence performed when a service search is performed before network connection. In this example, the STA-A (communication device) is a device that provides a service X, and the STA-B (communication device) is a device that uses the service X.

Upon receipt of an instruction to start a service providing operation from the user (F501), the STA-A goes into Listen State which is wait mode for waiting for a service search (F502). On the other hand, upon receipt of an instruction to start a service using operation from the user (F503), the STA-B searches for a partner device and a service provided by the partner device for a predetermined period of time in Search State (F504). For device detection, the STA-B first transmits a Probe Request (F505). Upon receipt of the Probe Request, the STA-A transmits a Probe Response including information about itself (STA-A) to the STA-B (F506). Next, the STA-B starts a service discovery function for the service X and transmits an SD Query (F507). In this example, the STA-B transmits a packet containing information indicating that the STA-B searches for a device that provides the service X. The packet may be transmitted by unicast, broadcast, or multicast. Upon receipt of the SD Query, the STA-A transmits an SD Response to the STA-B to indicate that the STA-A can provide the service X (F508). Service information may be added to the SD Response.

Upon determining, from the service search, that the STA-A can provide the service X, the STA-B establishes a wireless connection with the STA-A in accordance with the Wi-Fi Direct specification (F509). Thus, the wireless LAN connection and the IP setting between the STA-A and the STA-B are completed. Upon completion of the wireless connection process, the service X is started on the basis of the service information obtained in the service search (F510).

Specifically, if the STA-A is a printer and the STA-B is a digital camera, the STA-B searches for a printer having a printing function and detects the STA-A to wirelessly print a picked-up image on the STA-A.

Figure 6:
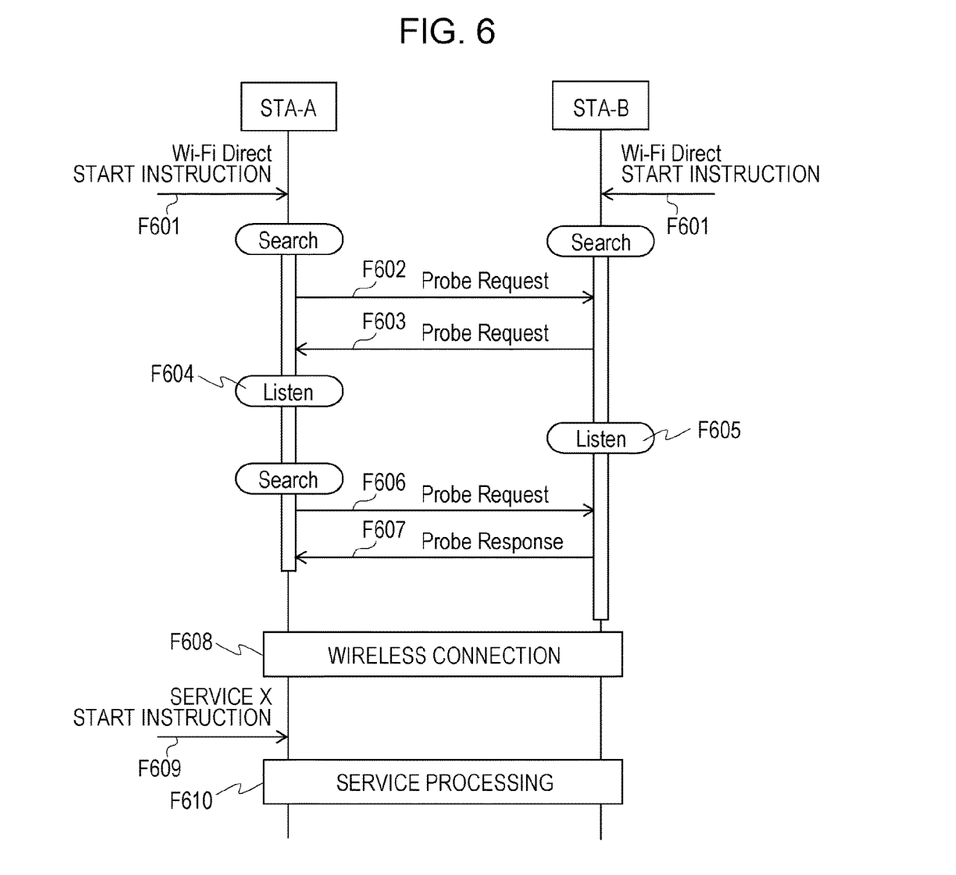
FIG. 6 is another sequence chart in the first embodiment.

FIG. 6 illustrates an operation sequence performed when the communication devices (STA-A and STA-B) are connected via Wi-Fi Direct without performing a service search before network connection.

The STA-A and the STA-B receive an instruction to start a Wi-Fi Direct operation from the user (F601). Here, the user does not give an instruction to start a specific service and requests only a network connection.

The STA-A goes into Search State for searching for a partner device, and transmits a Probe Request (F602). The STA-B also goes into Search State for searching for a partner device, and transmits a Probe Request (F603). Both the STA-A and STA-B are in Search State and cannot receive the Probe Request.

Then, the STA-A and the STA-B go into Listen State where they each wait for a search from a partner device (F604, F605). After the elapse of a random period of time, the STA-A goes into Search State again and transmits a Probe Request (F606). Since the STA-B is in Listen State at this point, the STA-B receives the Probe Request from the STA-A and transmits a Probe Response including information about itself (STA-B) to the STA-A (F607).

Upon detecting the STA-B, the STA-A establishes a wireless connection with the STA-B in accordance with the Wi-Fi Direct specification (F608). Thus, the wireless LAN connection and the IP setting between the STA-A and the STA-B are completed.

Upon completion of the wireless connection process, the user gives an instruction to start a service X (F609). The STA-A and the STA-B start the service X on the basis of the service information obtained in the service search (F610).

As described above, in the present embodiment, the communication device either transmits or waits for a search signal depending on the role in the service specified by the user. This makes it possible to reduce the number of operations involved in device and service searches. It is thus possible to reduce the time required to start the service and improve user convenience.

Second Embodiment

In the first embodiment described above, a service search is performed on the basis of a service specified in an upper-level application. In a second embodiment, the communication device performs scanning before a service search, and transmits or waits for a search signal depending on whether a service providing device or a service using device is present on the network. The configuration of each device will not be described here, as it is the same as that in the first embodiment.

Figure 7:
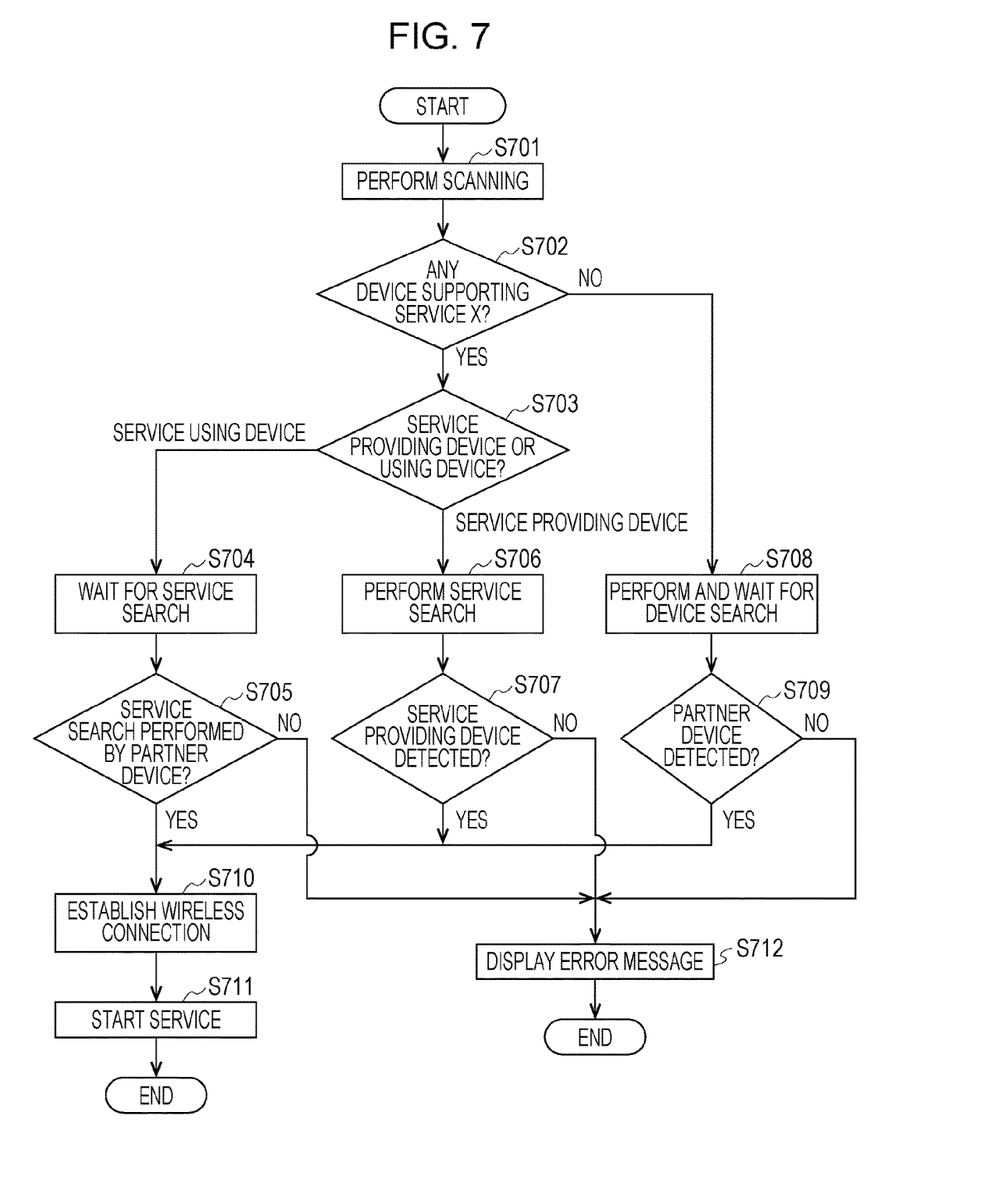
FIG. 7 is a flowchart of an operation performed by a communication device according to a second embodiment of the present invention.

FIG. 7 is a flowchart of an operation performed by a communication device. The operation of the communication device, from a service search to the start of service operation, will be described with reference to the flowchart.

Before the start of a Wi-Fi Direct operation, the Discovery control unit 202 searches for neighboring Wi-Fi Direct devices (step S701). For example, the Discovery control unit 202 broadcasts a Probe Request and receives a Probe Response from each device to detect neighboring Wi-Fi Direct devices.

Next, the Service Discovery control unit 204 determines whether there is any device that supports a specified service among the Wi-Fi Direct devices detected in step S701 (step S702). For example, if any of the Probe Responses received in step S701 contains information indicating that the device supports a service X, the Service Discovery control unit 204 determines that there is a device that supports a specified service, whereas if none of the Probe Responses received in step S701 contains information for determining whether the service X is supported, the Service Discovery control unit 204 determines that there is no device that supports the specified service. Also, if no Probe Response is received in step S701, the Service Discovery control unit 204 determines that there is no device that supports the specified service.

If it is determined that there is a device that supports the specified service (YES in step S702), the Service Discovery control unit 204 determines whether the device is a service providing device that provides the service X or a service using device that uses the service X (step S703). For example, if the Probe Response received in step S701 contains information indicating that the device provides the service X, the Service Discovery control unit 204 determines that the device is a service providing device, whereas if the Probe Response received in step S701 contains information indicating that the device uses the service X, the Service Discovery control unit 204 determines that the device is a service using device. Also, for example, if the Probe Response contains information indicating that the device is a printer, the Service Discovery control unit 204 determines that the device is a printing service providing device. That is, the determination as to whether the device is a service providing device or a service using device may be made in accordance with the device type.

If it is determined in step S703 that the detected partner device is a using device that uses the service X, the Service Discovery control unit 204 waits for a service search (step S704). On the other hand, if it is determined in step S703 that the detected partner device is a providing device that provides the service X, the Service Discovery control unit 204 performs a service search (step S706).

If it is determined that there is no device that supports the service X (NO in step S702), the device discovery process defined in Wi-Fi Direct is performed (step S708). The device discovery process involves alternately repeating Search State and Listen State in a random cycle.

The description of steps S704 to S707 and steps S709 to S711 will be omitted, as it is the same as that of steps S403 to S406 and steps S408 to S410 of FIG. 4 in the first embodiment.

Figure 8:
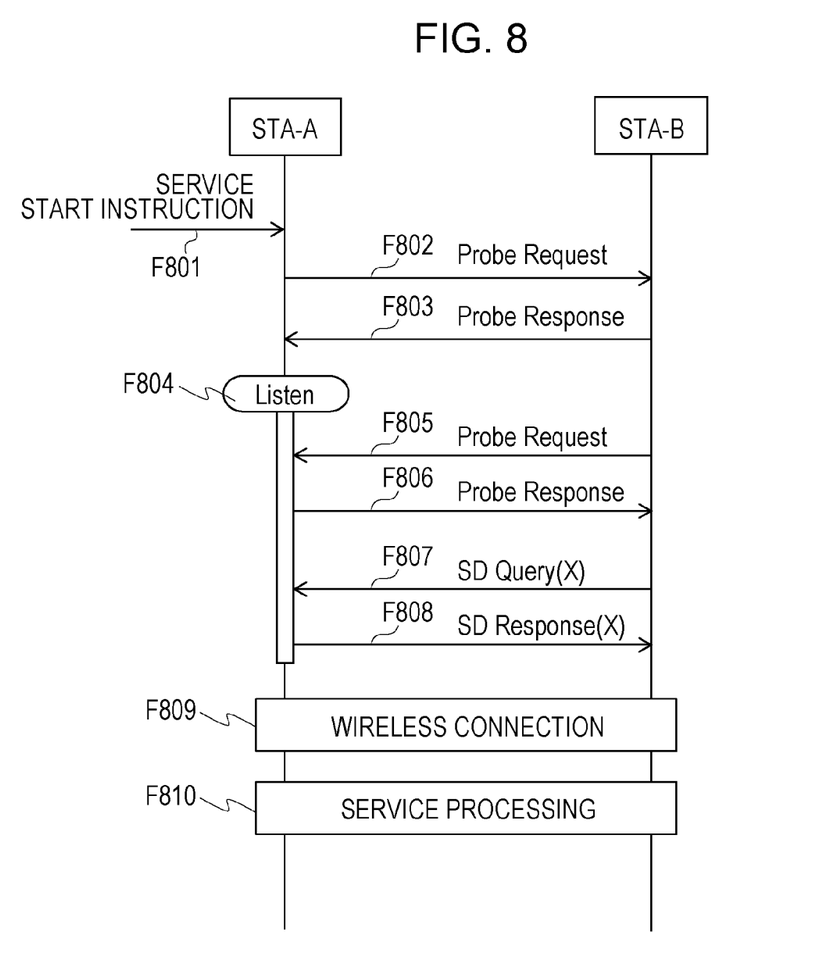
FIG. 8 is a sequence chart in the second embodiment.

FIG. 8 is a schematic diagram illustrating an operation sequence between a service providing device providing a service X (STA-A) and a service using device using the service X (STA-B).

Upon receipt of an instruction to start a service from the user (F801), the communication device (STA-A) transmits a Probe Request to search for neighboring devices (F802). The STA-B transmits, to the STA-A, a Probe Response containing information indicating that the STA-B is a service using device that uses the service X (F803). Upon receipt of the Probe Response from the STA-B, the STA-A determines that there is a neighboring service using device using the service X and goes into wait mode (Listen State) for waiting for a service search (F804). F805 and the subsequent operations will not be described here, as they are the same as F505 and the subsequent operations in the sequence of FIG. 5 in the first embodiment.

In the second embodiment, a search signal is either transmitted or waited for, depending on whether the neighboring device is a service providing device or a service using device. This makes it possible to reduce the number of operations involved in device and service searches. It is thus possible to reduce the time required to start the service and improve user convenience.

In the first embodiment, if the user specifies a service in the communication device or another device when a wireless network is established, the communication device either transmits or waits for a search signal. The communication device may change the ratio of the time for transmitting a search signal (Search State) to the time for waiting for a search signal (Listen State).

For example, when the communication device operates as a service using device, the communication device changes the ratio of the time for transmitting a search signal (Search State) to the time for waiting for a search signal (Listen State) to 2:1, whereas when the communication device operates as a service providing device, the communication device changes the ratio of the time for transmitting a search signal (Search State) to the time for waiting for a search signal (Listen State) to 1:2.

For example, when the ratio of the time for transmitting a search signal (Search State) to the time for waiting for a search signal (Listen State) is 2:1, the communication device alternately repeats transmission of a search signal for 200 milliseconds and waiting for a search signal for 100 milliseconds. The time for transmitting a search signal and the timer for waiting for a search signal may be 20 milliseconds and 10 milliseconds, respectively, instead of 200 milliseconds and 100 milliseconds, or may be randomly varied for each repetition.

Changing the time ratio as described above also makes it possible to reduce the time required to start the service and improve user convenience.

If the communication device cannot detect a partner device even when a predetermined period of time elapses after changing the ratio of the time for transmitting a search signal (Search State) to the time for waiting for a search signal (Listen State), the communication device may further change the time ratio. That is, if no partner device can be detected for a predetermined period of time, the communication device may change the ratio of the time for transmitting a search signal (Search State) to the time for waiting for a search signal (Listen State) to 1:1.

The present invention may be implemented by supplying a storage medium storing program code of software that implements the above-described functions to a system or apparatus, and causing a computer (or CPU or MPU) of the system or apparatus to read out and execute the program code stored in the storage medium. In this case, the program code read out of the storage medium implements the above-described functions of the embodiments, and hence the storage medium storing the program code constitutes the present invention.

Examples of the storage medium for supplying the program code include a flexible disk, a hard disk, an optical disk, a magneto-optical disk, a CD-ROM, a CD-R, a magnetic tape, a nonvolatile memory card, a ROM, and a DVD.

The above-described functions may be implemented not only by executing the program code read out by the computer, but also by causing an operating system (OS) running on the computer to perform part of or all the actual processing in accordance with an instruction of the program code.

The above-described functions may be implemented by writing the program code read out of the storage medium into a memory of a function expansion board inserted in the computer or into a memory of a function expansion unit connected to the computer, and then causing a CPU of the function expansion board or function expansion unit to perform part of or all the actual processing in accordance with an instruction of the program code.

According to the present invention, the communication device either transmits or waits for a search signal, depending on the role in the specified service. This makes it possible to reduce the time required to detect a partner device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-267135 filed Dec. 25, 2013 and No. 2014-208403 filed Oct. 9, 2014, which are hereby incorporated by reference herein in their entirety.

What is claimed is:

1. A communication device comprising:
   a searching unit configured to search for a function provided by another communication device;
   a notification unit configured to perform a notification of a function provided by the communication device;
   a determining unit configured to determine whether, when a wireless network is newly established between the communication device and the other communication device, performing a predetermined service via the wireless network is indicated from a user or not at the communication device; and a controlling unit configured to perform control, on the basis of a determination made by the determination unit, to increase a time period for the search performed by the searching unit and reduce a time period for the notification performed by the notification unit, or to reduce the time period for the search performed by the searching unit and increase the time period for the notification performed by the notification unit.

2. The communication device according to claim 1, further comprising an instruction unit configured to cause a user to instruct the communication device to perform the predetermined service, wherein the determining unit determines that performing the predetermined service is indicated in a case where the user instructs, via the instruction unit, the communication device to perform the predetermined service.

3. The communication device according to claim 1, further comprising a discrimination unit configured to make a determination as to whether the communication device is a function providing device or a function using device that uses the function provided by the other communication device via the wireless network, wherein in a case where the discrimination unit has made the determination before the wireless network is established between the communication device and the other communication device, the determining unit determines that performing the predetermined service is indicated.

4. The communication device according to claim 1, wherein by transmitting a signal, to the other communication device, which contains information about a service that the communication device can provide to the other communication device, the notification unit performs the notification of the service that the communication device can provide to the other communication device.

5. The communication device according to claim 4, wherein the notification unit transmits the signal to the other communication device as a response to a predetermined signal transmitted from the other communication device.

6. The communication device according to claim 1, wherein the searching unit transmits a predetermined signal and receives a response signal corresponding to the predetermined signal to detect a service that can be provided by the other communication device.

7. The communication device according to claim 5, wherein the predetermined signal is an SD Query defined in IEEE802.11u.

8. The communication device according to claim 5, wherein the predetermined signal is a Probe Request.

9. The communication device according to claim 1, wherein the searching unit performs the search in Search State defined in Wi-Fi Direct.

10. The communication device according to claim 1, wherein the predetermined service provided by communication between the communication device and the other communication device via the wireless network includes a printing service.

11. The communication device according to claim 1, wherein the predetermined service provided by communication between the communication device and the other communication device via the wireless network includes a video streaming service.

12. The communication device according to claim 1, wherein the predetermined service provided by communication between the communication device and the other communication device via the wireless network includes an image transfer service.

13. The communication device according to claim 1, wherein, in a case where the determination unit has determined that performing of the predetermined service is indicated, the controlling unit performs control in such a manner that the either the search performed by the searching unit when the wireless network is established between the communication device and the other communication device or the notification performed by the notification unit is performed.

14. The communication device according to claim 13, wherein in a case where a device providing a desired function cannot be discovered within a predetermined period of time after either the search performed by the searching unit or the notification performed by the notification unit is selectively started, the communication device alternately causes the searching unit to perform the search and the notification unit to perform the notification.

15. The communication device according to claim 13, wherein if the wireless network is not established within a predetermined period of time after either the search performed by the searching unit or the notification performed by the notification unit is selectively started, the communication device alternately causes the searching unit to perform the search and the notification unit to perform the notification.

16. The communication device according to claim 13, wherein, in a case where the communication device provides a service to be provided via the wireless network, the controlling unit performs control when the wireless network is established between the communication device and the other communication device in such a manner that the searching unit does not perform the search and the notification unit performs the notification.

17. The communication device according to claim 13, wherein, in a case where the other communication device provides a service to be provided via the wireless network, the controlling unit performs control when the wireless network is established between the communication device and the other communication device in such a manner that the searching unit performs the search and the notification unit does not perform the notification.

18. The communication device according to claim 13, wherein, in a case where the determination unit determines that performing of the predetermined service is not indicated, the controlling unit performs control when the wireless network is established between the communication device and the other communication device in such a manner that both the search performed by the searching unit and the notification performed by the notification unit are performed.

19. A method for controlling a communication device, comprising:

searching for a function provided by another communication device;

performing a notification of a function provided by the communication device;

determining whether, when a wireless network is newly established between the communication device and the other communication device, performing a predetermined service via the wireless network is indicated from a user or not at the communication device; and performing control, on the basis of a determination made by the determining, to increase a time period for the searching and reduce a time period for the performing the notification, or to reduce the time period for the searching and increase the time period for the performing the notification.

20. A storage device that stores a program for having a computer perform a method for controlling a communication device, the method comprising:

searching for a function provided by another communication device;

performing a notification of a function provided by the communication device;

determining whether, when a wireless network is newly established between the communication device and the other communication device, performing a predetermined service via the wireless network is indicated from a user or not at the communication device; and performing control, on the basis of a determination made by the determining, to increase a time period for the searching and reduce a time period for the performing the notification, or to reduce the time period for the searching and increase the time period for the performing the notification.

* * * * *